April 21, 1959        W. F. LASER        2,883,212

LABYRINTH TYPE MAGNETIC ROTARY SEAL

Filed Aug. 23, 1956        2 Sheets-Sheet 1

Inventor
WILLIAM F. LASER
by: Carlson, Pitzner, Hubbard & Wolfe
Attys.

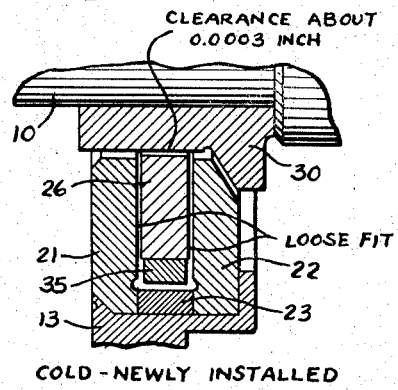
Fig. 3 — COLD-NEWLY INSTALLED
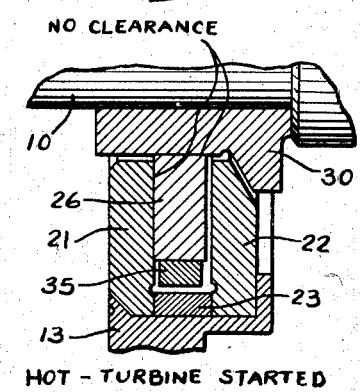
Fig. 4 — HOT - TURBINE STARTED
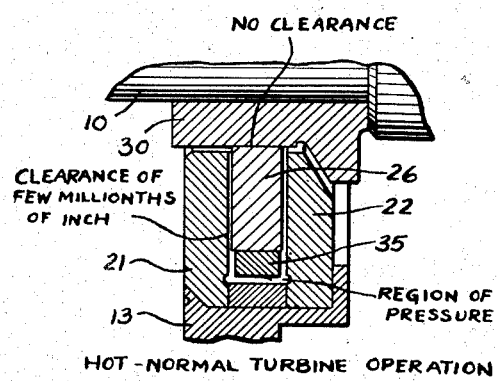
Fig. 5 — HOT - NORMAL TURBINE OPERATION
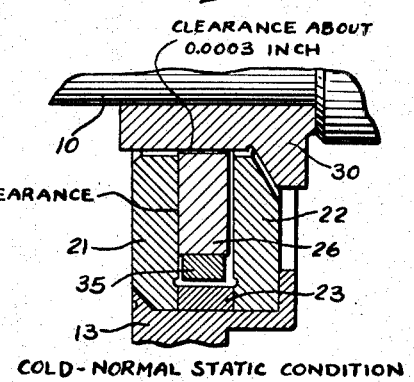
Fig. 6 — COLD - NORMAL STATIC CONDITION
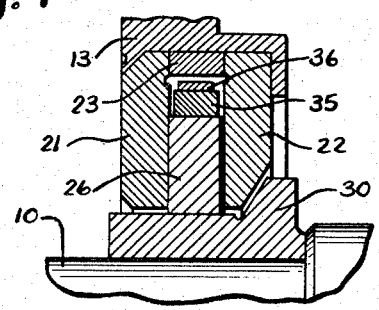
Fig. 7

United States Patent Office 2,883,212
Patented Apr. 21, 1959

2,883,212

LABYRINTH TYPE MAGNETIC ROTARY SEAL

William F. Laser, Hinsdale, Ill., assignor to City National Bank and Trust Company of Chicago, as trustee Application August 23, 1956, Serial No. 605,876

3 Claims. (Cl. 286—10)

The present invention relates to an improved seal intended to prevent gas or other fluid leakage from about a rotatable shaft. More particularly, the invention concerns a seal that is effective at extremely high temperature ranges and shaft r.p.m., such as are encountered in gas turbines, but which is also effective when the shaft is at rest.

As is well known, one of the basic engineering problems in gas turbine engine design is the confining of gas at temperatures on the order of 1000° F. when the shaft is rotating at approximately 100,000 r.p.m. As a result of the high speed, adequate lubrication of the relatively rotating sealing elements is next to impossible so that frequent replacement of worn and burned out seals has been necessary. The axial and radial expansion of the shaft at high temperatures presents a particularly difficult problem.

A rotary seal designed to overcome many of the difficulties and to function effectively at shaft speeds up to 150,000 r.p.m. and at temperatures of up to 1,400°, without wear or the danger of burning out, was disclosed in my U.S. application, Serial No. 508,029, filed May 13, 1955. Such device is not, however, capable of maintaining a perfect seal under all conditions when the shaft is stationary.

It is, therefore, an object of the invention to provide a rotary seal that is effective at extremely high speeds and high temperatures and yet also effectively seals when at rest. It is a collateral object to provide a positive rotary seal that has no organic elements, natural or synthetic, to be subject to heat deterioration.

It is a further object to provide a rotary seal having no relatively moving contacting parts to wear when in normal high speed operation but which has its sealing surfaces urged into a sealing relationship when at rest. It is a more detailed object to provide a novel floating type mechanical labyrinth seal which is magnetically urged into sealing position.

It is another object to provide a seal of the above type which is characterized by long life and minimum maintenance.

It is moreover an object to provide a floating type mechanical labyrinth seal capable of static sealing which is simple, inexpensive and reliable, having no resilient parts to adjust or be subject to failure.

Other objects and advantages of the invention will become apparent upon reading the following detailed discussion and upon reference to the attached drawings in which:

Fig. 3 is a partial section showing the parts of the seal as first installed in a gas turbine.

Fig. 4 is as Fig. 3 when the turbine has been started and is hot.

Fig. 5 is as Fig. 3 when the turbine is running and the seal is in normal operation.

Fig. 6 is as Fig. 3 when the turbine has stopped and cooled.

Fig. 7 is a modification of the Fig. 1 structure.

While the invention will be described in connection with a preferred embodiment, it will be understood that I do not intend to limit the invention to that embodiment but, on the contrary, intend to cover such alternative embodiments and constructions as may be included within the spirit and scope of the appended claims.

Figure 1:
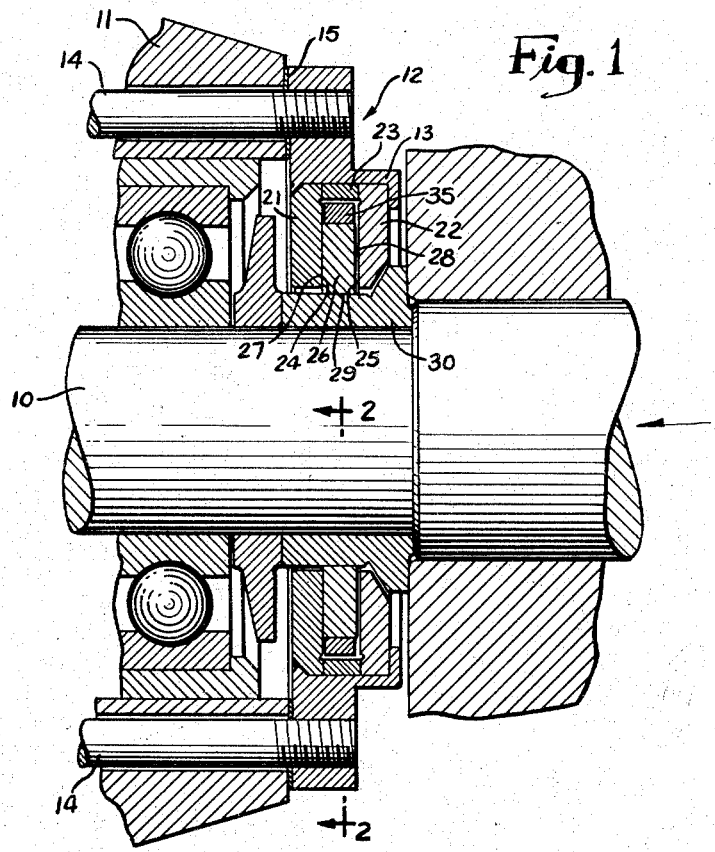
Figure 1 is a section view taken along the axis of the seal.
Figure 2:
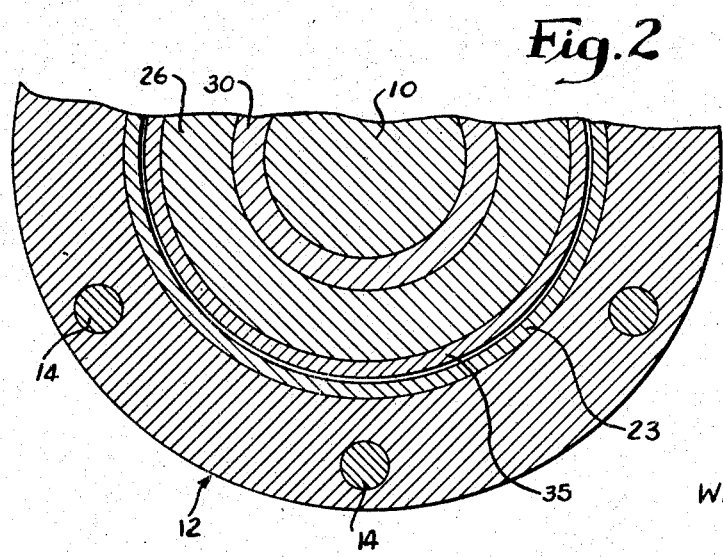
Fig. 2 is a section view taken along line 2—2 of Fig. 1.

Turning first to Fig. 1, there is shown a shaft 10 mounted for rotation within a housing 11. A seal generally indicated at 12 and constructed in accordance with the invention is provided to prevent the escape along the shaft of fluid or vapor under pressure in the direction indicated by the arrow. The seal elements to be described are contained within an annular cup 13 which is adapted to be mounted on the housing 11 in any convenient manner. In this instance, bolts 14 draw the cup against a gasket 15 interposed between the cup 13 and the housing. It can be readily seen that the seal elements contained within the cup, together with the cup, form a package-like seal cartridge.

The sealing elements fixed to the housing, i.e., the stator, comprise two annular discs 21 and 22 separated by a spacer ring 23. The ring 23 is machined with paralleled sides to a precisely measured axial thickness so as to position the discs 21, 22 in precisely parallel planes. The flat inside sealing surfaces 24, 25 of the discs are lap finished so as to be uniformly smooth and flat to a tolerance of only millionths of an inch. In short, the finished sides 24, 25 of the discs abut the finished edges of the spacer ring 23 to form a closed annular chamber opening only inwardly.

The rotor of the seal 12 is carried within the annular chamber formed by the stator and is in the form of an annular disc 26 which may be formed of carbon or ceramic material. For reasons to be discussed, the rotor material is preferably chosen to have a thermal coefficient of expansion which is less than that of the steel utilized in forming the shaft assembly. For example, the rotor may be formed of carbon having a thermal expansion coefficient of $1.5 \times 10^{-6}$ inches/° F., while the shaft assembly has a coefficient of $10.5 \times 10^{-6}$ inches/° F.

The rotor, similar to the stator elements, is a precision-machined part, having sides lapped to be smooth, flat and parallel with a tolerance on the order of millionths of an inch to form two sealing surfaces 27, 28. The interior cylindrical surface 29 which contacts the rotatable shaft is also lap finished. In order that the shaft surface contacting and carrying the rotor may be smooth and perfectly cylindrical, it is desirable to mount a sleeve 30 on the shaft for rotation therewith, since the sleeve can be more easily provided with a properly finished outer cylindrical surface. The illustrated embodiment includes such a sleeve, but it is understood that the sleeve could be omitted so that the shaft itself is in contact with the rotor.

In accordance with the present invention a ring 35 of permanently magnetic material surrounds and is fixed to the rotor 26. The ring 35 is preferably formed of a sintered magnetic alloy which is well known in the trade as Alnico. By forming the ring of a material such as Alnico, a relatively powerful magnetic force is obtained, considering the limited cross section of the member. The ring also serves an additional purpose. As mentioned above, the rotor 26 is composed of carbon or ceramic material and is, therefore, frangible. When rotating at the extremely high operating speeds, the centrifugal force tends to separate the frangible rotor, and the ring serves to resist this force. If the ring, which is primarily intended to be a magnet, is not of sufficient strength in a seal of a particular desired size, a band 36 of high tensile strength steel can be placed about both the rotor and ring, as shown in Fig. 7. The steel band thus reinforces the rotor and ring assembly permitting them to operate at the high r.p.m. required. Both the band and the ring, but particularly the band, may be prestresed by using a shrink fit.

In operation the magnetic ring 35 exerts an attractive force toward one of the discs forming the enclosing annular chamber. In the present embodiment the disc 21 is formed of magnetic steel while the disc 22, the cylinder 23 and the cup 13 are formed of non-magnetic stainless steel.

To understand how the present invention effects a positive high pressure seal under standby conditions as well as during high speed, high temperature operation, it is helpful to trace the sequence of events as they are understood to occur in a gas turbine. Fig. 3 shows a seal according to the invention as first installed in a turbine. Fig. 4 shows the seal as the turbine is brought up to operating speeds and temperatures. Fig. 5 shows the seal during normal turbine operation. Fig. 6 shows the seal after the turbine is shut off and cooled. In all of the figures, the relative positions are exaggerated to show the clearances more clearly.

The seal of the present invention is said to be of a "floating" type since the rotor 26 is free to slide or "float" on the sleeve 30 under static non-operating conditions. To permit the rotor to slide, the sealing surfaces 24, 25 of the discs 21, 22 are spaced apart a few thousandths of an inch more than the thickness of rotor 26, and the inner diameter of the rotor is about 0.0003 of an inch greater than the outer diameter of the sleeve 30. Thus, when first installed, the seal will appear as shown in Fig. 3.

When hot gas is introduced to the turbine, the shaft 10 and rotor 26 begin to rotate, and as they reach the high operational speeds, centrifugal force tends to expand the rotor so that it is more free to slide on sleeve 30. As the temperature of the turbine rises, the heated steel shaft 10 expands both radially and axially. Since the rotor is lose on the sleeve, the axial shaft expansion simply causes the shaft and sleeve to move through the rotor. The direction in which shaft 10 would expand depends upon its mounting, but for purposes of illustration, it has been assumed to be toward the left in Figs. 3 to 6.

During the final stages of expansion, as the turbine reaches operating temperatures, the rotor 26 will tend to bind on the sleeve 30 since, it will be remembered, the rotor has a lower coefficient of expansion than the shaft and sleeve. At the final operating temperature the rotor is tightly bound in positive sealing engagement with the sleeve and cannot slide thereon. Thus, the final bit of axial shaft expansion may carry the rotor along with the sleeve into contact with the disc 21, as shown in Fig. 4. However, at the high speed of rotor rotation characteristic of a gas turbine the contacting surfaces 24 and 27 are worn away a small amount, on the order of a few millionths of an inch, so that in normal steady operation there are no contacting parts, as shown in Fig. 5.

The limited clearance between rotor 26 and disc 21 would provide a partial seal, but there is no tendency for the gas to escape between these members due to a pressure build-up in the annular chamber surrounding the rotor. The gas within the narrow confines of the chamber comes unavoidably into contact with the whirling rotor 26 which flings the gas molecules outwardly, operating much like a centrifugal pump. A region of pressure is thus built up within the chamber which is greater than the pressure on either side of the rotor. The gas molecules forming this region of pressure cannot escape along the rotor due to its pump-like action, and the pressure forms a block which acts to prevent the gas in the housing from escaping, thus producing an effective positive seal during normal turbine operation.

When the turbine is stopped by shutting off the supply of hot gas, the shaft rotation slows down and the temperature drops. The cooling shaft contracts to the right in Fig. 5, drawing with it the still bound rotor 26 and pulling it away from disc 21. Upon continued cooling, the radial contraction of the shaft and sleeve, exceeding that of the rotor with its lower coefficient of expansion, leaves the rotor again free to slide on the sleeve.

At this point the magnetic force exerted between the ring magnet 35 and the magnetic disc 21 draws the rotor 21 against the disc and holds it there until the shaft stops rotating. When stopped, the seal is in the position shown in Fig. 6, the rotor 26, and the disc 21 being in sealing contact. This sealing contact prevents a blast of hot gas from leaking between the loosely fitting rotor 26 and discs 21 and 22 when the turbine is again started up and before it reaches operating speed and temperature. Thus, it can be seen that the seal of the invention produces an effective seal under static non-operating conditions, as well as high speeds and temperatures.

While it has been assumed that the direction of axial shaft expansion was to the left in Figs. 3 to 6, it will be apparent that the operating seal shown in Figs. 4 and 5 would be equally effective if the shaft expanded toward the right and carried the rotor against the disc 22. In this case, just as in the illustration above, when the turbine slows down and cools, the rotor would be again free to slide on the shaft assembly and the magnetic force between ring 35 and disc 21 would position the rotor in the non-operating standby position shown in Fig. 6.

I claim as my invention:

1. In a fluid seal for shaft assemblies the combination comprising an annular rotor having lapped sealing surfaces on its two flat sides and on its interior cylindrical surface, said rotor being slidably mounted in sealing engagement on an outer cylindrical lapped sealing surface of the shaft, a ring of highly magnetic material magnetized to form a permanent magnet surrounding said rotor about its outer cylindrical surface and being fixed thereto, and a pair of annular discs, each having one flat lapped sealing surface, disposed on either side of said rotor so that their flat sealing surfaces are parallel and closely adjacent to the flat sealing surfaces of the rotor, only one of said discs being magnetic so that the magnetized ring will urge the slidable rotor toward the magnetic disc and into sealing engagement therewith.

2. In a fluid seal for high speed shaft assemblies the combination comprising an annular rotor of frangible material having lapped sealing surfaces on its two flat sides and on its interior cylindrical surface, said rotor being slidably mounted in sealing engagement on an outer cylindrical lapped sealing surface of the shaft, a ring member surrounding said rotor about its outer cylindrical surface and being fixed thereto, a pair of annular disc members, each having one flat lapped sealing surface, disposed on either side of said rotor so that their flat sealing surfaces are parallel and closely adjacent to the flat sealing surfaces of the rotor, the ring member and one of the disc members being magnetic and one of the two magnetic members being a permanent magnet so as to create a mutual attraction between the two, and a cylindrical band of high tensile strength surrounding said ring and rotor and tightly gripping the former.

3. In a fluid seal for high speed, high temperature shaft assemblies the combination comprising an annular rotor having lapped sealing surfaces on its two flat sides and on its interior cylindrical surface, said rotor being slidably mounted in sealing engagement on an outer cylindrical lapped sealing surface of the shaft, said shaft having a thermal coefficient of expansion greater than that of said rotor so that in normal high speed, high temperature operation the rotor will bind on said shaft in positive sealing engagement therewith, a ring of highly magnetic material magnetized to form a permanent magnet surrounding said rotor about its outer cylindrical surface and being fixed thereto, a pair of annular discs, each having one flat lapped sealing surface, disposed on either side of said rotor so that their flat sealing surfaces are parallel and closely adjacent to the flat sealing surfaces of the rotor, and a cylindrical ring surrounding said rotor and magnetic ring and extending between said discs to form therewith an annular chamber substantially enclosing said rotor and magnetic ring, one of said discs being magnetic so as to create a mutual attraction between said magnetic ring and the magnetic disc.

References Cited in the file of this patent

UNITED STATES PATENTS

| | | |
|---|---|---|
| 1,187,212 | Westinghouse | June 13, 1916 |
| 1,683,756 | Blache | Sept. 11, 1928 |
| 2,405,464 | Storer | Aug. 6, 1946 |
| 2,571,035 | Hastings | Oct. 9, 1951 |
| 2,685,463 | Pollard | Aug. 3, 1954 |

FOREIGN PATENTS

| | | |
|---|---|---|
| 678,981 | Great Britain | Sept. 10, 1952 |